United States Patent [19]
Schuster et al.

[11] 3,840,392
[45] Oct. 8, 1974

[54] COATING ASBESTOS-CEMENT AND THE LIKE

[75] Inventors: Ludwig K. Schuster, Dresher; Singkata Tongyai, Warrington, both of Pa.

[73] Assignee: Pennwalt Corporation, Philadelphia, Pa.

[22] Filed: Feb. 3, 1972

[21] Appl. No.: 223,320

Related U.S. Application Data

[63] Continuation-in-part of Ser. No. 20,064, March 16, 1970, abandoned, which is a continuation-in-part of Ser. No. 525,663, Feb. 7, 1966, Pat. No. 3,516,847, which is a continuation-in-part of Ser. No. 434,214, Feb. 23, 1965, Pat. No. 3,421,934.

[52] U.S. Cl....... 117/119.6, 117/123 B, 117/123 D, 117/126 AI, 117/126 AR
[51] Int. Cl................................................ B44d 1/48
[58] Field of Search.. 117/46 FA, 46 FC, 54, 123 B, 117/123 D, 126 AI, 126 AR, 119.6; 148/6.2

[56] References Cited
UNITED STATES PATENTS

| | | | |
|---|---|---|---|
| 3,085,907 | 4/1963 | Zdanowski et al | 117/126 |
| 3,094,435 | 6/1963 | Schuster et al. | 117/132 |
| 3,472,681 | 10/1969 | Schuster et al. | 117/126 |

*Primary Examiner*—William D. Martin
*Assistant Examiner*—M. R. Lusignan
*Attorney, Agent, or Firm*—Connolly and Hutz

[57] ABSTRACT

Pigmented, in situ reduced zinc dichromate coatings on asbestos-cement and similar surfaces are made more reproducible in color by including as at least a portion of the reducing agent a hexitol or pentitol such as sorbitol, or a low alkanolamine, or mixtures of these. An acid like phosphoric acid that forms a water-insoluble calcium salt but does not precipitate the zinc can also be added to the coating formulation.

2 Claims, No Drawings

COATING ASBESTOS-CEMENT AND THE LIKE

This application is a continuation-in-part of application Ser. No. 20,064 filed Mar. 16, 1970, now abandoned, which application is a continuation-in-part of application Ser. No. 525,663 filed Feb. 7, 1966 (Pat. 3,516,847 granted June 23, 1970), which in turn is a continuation-in-part of application Ser. No. 434,214 filed Feb. 23, 1965 (Pat. 3,421,934 granted Jan. 14, 1969).

The present invention relates to the coating of cementitious and other stone-like surfaces such as asbestos-cement panels, concrete, stone and cement. The invention is particularly useful for asbestos-cement building material, such as flat and corrugated panels for roofing and siding.

Among the objects of the present invention is the provision of improved coating mixtures and techniques for asbestos-cement panels and improved products thus produced.

The foregoing as well as additional objects of the present invention will be more fully understood from the following description of several of its exemplifications.

According to the present invention the above surfaces are coated with a coating mixture in the form of an aqueous dispersion of an acrylic or thermosetting butadiene-styrene resin containing dissolved zinc dichromate in an amount from about one to five times the weight of the resin, a dissolved reducing agent compatible in the dispersion for at least about 2 hours at room temperature, but effecting the substantially complete reduction to trivalent condition of the chromium in the dichromate when the dispersion is dried and heated to 180°C, the mixture also containing in dispersed condition $TiO_2$ pigment in a concentration at least one-eighth the weight of the resin, and sufficient total pigment to bring the pigment concentration to from about 16 to 20 percent of the cured coating weight, and at least one-third of the reducing agent is sorbitol or any other hexitol or pentitol, or a lower alkanolamine.

The foregoing reducing agents are more desirable than sugar for example since they seem to cause more effective reduction of the hexavalent chromium to trivalent condition and thus provide more reproducible colors in the coated products without having to effect curing at the high temperatures otherwise needed for such coating mixtures. Thus in the coating of metal it has been standard to use curing temperatures of at least about 190°C to effect 95 percent reduction of the chromium and 200°C to effect complete reduction, but when the foregoing reducing agents are used all the chromium is reduced at 190°C.

Lower alkanolamines that are suitable for use in this connection include triethanolamine, diethanolamine, diethanolmethylamine, ethanol dimethylamine, triisopropanol amine, ethanol diethylamine and ethanol ethyl methylamine. Preferred coating weights after curing are from about 1.5 to about 2.5 grams per square foot of coated surface.

The alkanolamines are also fairly strong pH increasers and partially neutralize the free acid in the aqueous coating mixture. This has the further effect of increasing the pot life of the coating mixture. Thus an unneutralized mixture in which sorbitol is the only reducing agent aside from the wetting agents that may be used to disperse the resin and pigment, can have a pot life at room temperature of about 3 hours, but when about one-third of the sorbitol is replaced by triethanolamine the pot life is increased to about 24 hours.

A similar increase in pot life is obtained by partially neutralizing the coating mixture with triethylamine or trimethylamine or similar amines, although such amines do not function as reducing agents.

The increase in pH caused by volatile or oxidizable agents such as the amines and alkanolamines, does not materially affect the choice of curing temperature. An unneutralized mixture that is readily cured at 190°C will still cure at that temperature after partial neutralization by such a volatile or oxidizable agent. For best low-temperature curing the pH of the coating bath should be two or lower.

The curing temperature can be lowered by adding to the coating bath a strong acid like phosphoric acid or other acid that doesn't precipitate the zinc but will form a water-insoluble calcium salt with the calcium contained in the asbestos-cement. The maximum curing temperature with such additive need not be over 180°C. Such acid can be added in an amount from about one-twentieth to about one-half the concentration of the zinc dichromate by weight.

A feature of the invention is that the heat treatment required for curing the coating need not be intense enough to immediately convert the desired amount of hexavalent chromium to trivalent condition. For example, asbestos-cement plates can have the coating mixtures of the invention applied to surfaces singed to a surface temperature of 130°C in the manner described in the specification of U.S. pat. No. 3,516,847, after which the coated surfaces can be heated, for example, by flaming or radiant heating for about 2 seconds, to a surface temperature of 170°C, and the coated plates then stacked. At the completion of the heating to 170°C the conversion of the chromium is clearly not complete since a distinct brown coloration is still evident in the coating. This brown color is due to the unreduced hexavalent chromium and is generally not uniform so that it effects a non-reproducible coloring which is undesirable where the product is to show a color uniformity. However, while standing in stacked condition for a number of hours the brown coloration gradually fades and in about 1 day's time it is no longer visible. During the stacking the surface temperatures on each of the stacked coatings undergoes gradual lowering since the stack provides considerable insulation against heat loss. The very short high temperature heating during the curing and the very short flaming before the coating is sprayed on leave the asbestos-cement substrate substantially unaffected and cause its moisture loss to be so low that it can be ignored. No subsequent conditioning of the plates is therefore required.

The coatings of the present invention show better resistance to cratering during their drying and curing.

The following examples typify the present invention:

EXAMPLE I

| | |
|---|---|
| Aqueous dispersion of copolymer of 20% ethyl acrylate and 80% methyl methacrylate, containing 45% solids | 12 lbs. |
| 70% aqueous solution of D-sorbitol | 0.8 lb. |
| triethanolamine | 1.2 lbs. |
| 20% aqueous solution of p-nonyl phenoxy octaethoxyethanol | 1.1 lbs. |
| 40% aqueous dispersion of $TiO_2$ pigment | 5 lbs. |
| 35% aqueous dispersion of carbon black | 5.8 lbs. |

EXAMPLE I-Continued

| | |
|---|---|
| $CrO_3$ | 4.8 lbs. |
| 75% aqueous $H_3PO_4$ | 3.7 lbs. |
| Zinc oxide | 2.2 lbs. |
| Water | 63.4 lbs. |

The organic ingredients and the pigments can be first mixed together to form a concentrate that is stable and can be kept for many months but to avoid mold growth about one-fourth percent formaldehyde can be added. The remaining chemicals can then be mixed with about one-eighth of the water to also form a stable concentrate that can be kept for long periods. When all the ingredients are combined the resulting bath has a pot life of about 2 days at room temperature. Before such time period elapses the bath can be sprayed onto asbestos-cement panels in two coats as described in connection with the drawing of Ser. No. 525,663. The panel surfaces coated are preheated to about 170°C by direct impingement of gas flames and the amount of coating sprayed is adjusted so that the total coating weight after curing is 2 grams per square foot. The first spray coat is applied after the preheat flaming is completed and the preheated surfaces cool down to about 140° – 150°C. The application of the spray brings the surface temperature further down and the panels are then passed under a bank of radiant lamps until the coated surfaces reach a temperature of 180°C. A uniform black coating is thus produced, and the panels so coated will withstand years of weathering as roofing plates without efflorescence and without the growth of mold or fungi.

Essentially the same results are obtained when other acrylic resins or thermosetting butadiene-styrene resins are substituted for the copolymer of Example I. Suitable resins of these kinds are disclosed in U.S. Pat. Nos. 3,053,693 and 3,053,702 and are particularly weather-resistant. In the type of formulation given in Example I they make very protective coatings and the action of the pigments in hiding the asbestos-cement surface plays an important part in such protection.

The relatively low curing temperature of the present invention reduces the coating expenses, and because of the uniform nature of the coloring effected by the chromium compounds in the coating formulation, the final color of the coating is easily reproduced so that there is no significant color matching problem. It is also preferred to use the least expensive pigments such as iron oxides and carbon black, but without the minimum amount of $TiO_2$ indicated above the inexpensive pigments do not provide sufficient hiding in the low coating weights of the present invention.

By omitting the phosphoric acid from Example I very good results are also obtained using the stack-curing procedure described above, with the curing temperature raised to 180°C.

EXAMPLE II

The ingredients of Example I are used in the same amounts except that the amount of resin dispersion is increased to 13.5 lbs., the amount of $TiO_2$ dispersion reduced to 2.8 lbs., the phosphoric acid replaced by 0.5 lb. 96 percent sulfuric acid, and the carbon black dispersion replaced by 6.5 lbs. of a 45 percent aqueous dispersion of red iron oxide pigment. The astestos-cement panels were pre-flamed to a surface temperature of 165°C and the coating of the present example sprayed after cooling off to a surface temperature of 90° – 95°C. The coating was cured at 180°C. Very good brown-colored panels having a coating weight of 1.5 grams per square foot were thus produced.

EXAMPLE III

The composition of Example I was modified by substituting a methyl methacrylate homopolymer for the resin, eliminating the triethanolamine, increasing the amount of the sorbitol solution to 2.2 lbs., reducing the amount of the carbon dispersion to 2.9 lbs., and reducing the amount of phosphoric acid solution to 3.4 lbs. The modified coating bath had a pot life of about 3 hours and is used as in Example I to provide very desirable dark grey panels with a coating weight of 2½ grams per square foot.

Using a similar coating technique, a cement-type stucco wall covering layer was also given a very effective colored protecting coating. In this type of coating the flames and curing lamps were moved over the wall in a pattern that covered all of its cemented surface.

EXAMPLE IV

The composition of Example I was modified by substituting for the resin dispersion an equal amount of a 45 percent dispersion of the commercial acrylate copolymer C–72 available from Rohm & Haas, eliminating the sorbitol, substituting for the triethanolamine 2.7 lbs of diethanol isopropylamine and increasing the amount of carbon dispersion to 7.5 lbs. The coating was flamed and cured as in Example I and the cured panels were of very good black color.

EXAMPLE V

The composition of Example I was modified by substituting for the resin 13 lbs. of a 45 percent aqueous dispersion of the commercial acrylate copolymer AC–73 available from Rohm & Haas, substituting for the sorbitol 11 lbs. of a 14 percent aqueous solution of D-mannitol, replacing the carbon dispersion by an equal amount of the $TiO_2$ dispersion, reducing the amount of aqueous phorphoric acid to 2 lbs. and reducing the amount of water added to 53.5 lbs. An adequately protected highly reproducible light green panel was thus produced.

EXAMPLE VI

The formulation of Example I was here modified by substituting for the resin 28 lbs. of a 20 percent aqueous solution of polyacrylic acid having a molecular weight of about 90,000, replacing the aqueous sorbitol by 5.6 lbs. of a 10 percent aqueous solution of dextrose, replacing the triethanolamine by 2.3 lbs. of ethanol diethylamine, replacing the wetting agent by an equal amount of p-dodecylphenyl decaethoxyethanol, substituting for the aqueous carbon black an identical amount of 35 percent aqueous dispersion of black $Fe_3O_4$ pigment, and reducing the amount of added water to 51.2 lbs. The modified coating is applied as in Example I to produce very desirable gray-colored panels.

EXAMPLE VII

The formulation of Example I was modified to substitute for the resin an equal amount of the butadiene-styrene copolymer described in Example II of U.S. Pat. No. 3,053,693, omitting the sorbitol, replacing the triethanolamine by 1.8 lbs of diethanolamine, increasing the amounts of the TiO₂ and carbon dispersions to 5.4 and 6.3 lbs. respectively, and increasing the amount of aqueous phosphoric acid to 4.1 lbs. The modified formulation was applied by the process described in Example II of the present specification, and the resulting panels were of excellent color and weathering characteristics.

EXAMPLE VIII

The formulation of Example I is modified by substituting for the phorphoric acid solution 0.6 pound of 48 percent solution of hydrofluoric acid in water, substituting an equal amount of sucrose for the triethanolamine, and an equal amount of TiO₂ pigment dispersion for the carbon black dispersion. A very easily matched green protective coating is formed after curing.

Phosphoric, sulfuric and hydrofluoric acids are all suitable for use as the extra acid in accordance with the present invention inasmuch as they all form water-insoluble calcium salts with the leachable calcium always found on asbestos-cement surfaces, yet they do not precipitate zinc salts in the coating bath. In the coating mixtures these acids are in equilibrium with the zinc dichromate, so that the same mixtures can be prepared by mixing free chromic acid with zinc hydrogen phosphate or zinc sulfate or zinc fluoride, in the appropriate proportions, along with additional acid as called for to produce the appropriate final concentration.

Phosphoric acid is the preferred acid to be added to the coating mixture because it shortens the pot life of the coating mixture less than sulfuric or hydrofluoric acid, and hydrofluoric acid also adds handling problems because of its corrosiveness and health hazard. Thus concentrates containing hydrofluoric acid as described in connection with Example VIII should be kept in rugged plastic containers. Plastic or nickel tanks and other equipment are also suitable for holding coating mixtures containing surfuric or hydrofluoric acid.

As pointed out above, in each of the examples a concentrate of the resin, reducing agents and pigment is advantageously prepared and kept separate from the acid ingredients which can be in a separate concentrate. Both of these types of concentrates should have at least about 40 percent solute by weight so that they can more readily be packed, shipped and stored. Sorbitol has an advantage in this connection since it can be prepared in 70 percent concentrations in water and can be added to concentrates in this form so that it mixes promptly without causing much dilution. The alkylolamines are also helpful in this connection inasmuch as they are liquids and will immediately dissolve in the concentrates when added to them in undiluted form.

In general the resin-reducing agent-pigment concentrates should contain at least about 20 percent resin and at least 10 percent pigment, as well as at least about 5 percent reducing agent, all computed by weight.

The resin can be reduced below the concentrations indicated above and can be eliminated altogether, although this leaves the pigment in a less bonded condition on the asbestos-cement so that it can be rubbed off to some extent.

The following example has a 21.5 to one ratio of zinc dichromate to resin and gives after curing at 170°C on asbestos-cement or precast concrete panels a light green coating of good appearance and weatherability.

EXAMPLE IX

| | |
|---|---|
| Resin dispersion of Example I | 7.0 lbs. |
| 70% aqueous solution of D-sorbitol | 0.8 lb. |
| Triethanolamine | 1.2 lbs. |
| 20% aqueous solution of p-nonyl phenoxy octaethoxy ethanol | 1.5 lbs. |
| 40% aqueous dispersion of TiO₂ pigment | 9.4 lbs. |
| CrO₃ | 4.8 lbs. |
| 75% aqueous H₃PO₄ | 3.7 lbs. |
| Zinc oxide | 2.2 lbs. |
| Water | 69.2 lbs. |

A 5 to 1 ratio of zinc dichromate to resin is shown in the next example:

EXAMPLE X

| | |
|---|---|
| Resin dispersion of Example III | 3.8 lbs. |
| Triethanolamine | 2.3 lbs. |
| 20% aqueous solution of p-nonyl phenoxy octaethoxy ethanol | 2.0 lbs. |
| 40% aqueous dispersion of TiO₂ pigment | 8.0 lbs. |
| 45% aqueous dispersion of Cr₂O₃ pigment | 1.3 lbs. |
| CrO₃ | 6.1 lbs. |
| 75% aqueous H₃PO₄ | 4.6 lbs. |
| Zinc oxide | 2.3 lbs. |
| Water | 69.7 lbs. |

A deep green coating was obtained after curing at 175°C.

Obviously many modifications and variations of the present invention are possible in the light of the above teachings. It is, therefore, to be understood that within the scope of the appended claims the invention may be practiced otherwise than as specifically described.

What is claimed is:

1. A method of coating the surfaces of a series of asbestos-cement plates, which method is characterized by applying to the surfaces a coating mixture in the form of an aqueous dispersion of an acrylic or thermosetting butadiene-styrene resin containing dissolved zinc dichromate in an amount from about one to about five times the weight of the resin, a reducing agent in an amount that is compatible in the dispersion for at least about 2 hours at room temperature but that causes substantially complete reduction of the chromium to trivalent condition when the dispersion is dried and heated to 180°C, at least one-third of the reducing agent being a hexitol or pentitol, and at least one-third of the reducing agent being a lower alkanolamine, the mixture also including in dispersed condition TiO₂ pigment in a concentration at least one-eighth the weight of the resin and sufficient total pigment to bring the pigment concentration to from about 16 percent to about 20 percent of the cured coating weight, the mixture being applied in an amount that after curing leaves a coating weight between about 1.5 and 2.5 grams per square foot, heating the coated surfaces to a temperature no higher than about 180°C for a few seconds to partially cure the coating, and then stacking the plates with the heated surface to cause the curing to complete itself without the further application of heat.

2. The method of claim 1 in which the coating composition contains phosphoric acid in an amount by weight about one-fourth to about one-half the zinc dichromate content, and the heating temperature is 170°C.

* * * * *